DIRECT CURRENT AMPLIFIERS

Filed March 23, 1959 2 Sheets-Sheet 1

INVENTOR.
NORTON W BELL
BY
Christie, Parker & Hale
ATTORNEYS.

May 7, 1963 N. W. BELL 3,089,097

DIRECT CURRENT AMPLIFIERS

Filed March 23, 1959 2 Sheets-Sheet 2

INVENTOR.
NORTON W. BELL
BY Christie, Parker & Hale
ATTORNEYS

United States Patent Office 3,089,097

Patented May 7, 1963

3,089,097
DIRECT CURRENT AMPLIFIERS

Norton W. Bell, Monrovia, Calif., assignor, by mesne assignments, to Consolidated Electrodynamics Corporation, Pasadena, Calif., a corporation of California Filed Mar. 23, 1959, Ser. No. 801,099
12 Claims. (Cl. 330—9)

Figure 1:
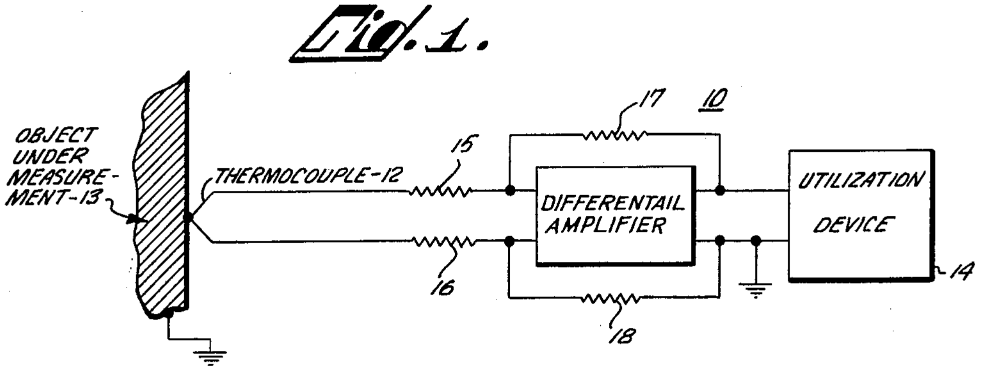

This invention relates to direct current amplifiers.

This application is a continuation in part of my earlier filed application having Serial No. 707,036, filed on January 3, 1958, and assigned to the same assignee as this application, now abandoned.

In some measurement and instrumentation applications low-level or low amplitude signals are often encountered and which signals must be amplified to a relatively high level before they may be advantageously used. Typical of these applications are signals provided by sensing devices such as thermocouples, strain gauges and the like wherein low-level direct current signals are provided. It is also typical of these applications that the low-level signals may be associated with an electrically noisy environment. The electrically noisy environment may include alternating current interference signals which may be common with respect to ground to the two amplifier terminals associated with the sensing devices and which interference signals are commonly known in the art as common mode signals. Interference signals known as normal mode signals also may appear between the amplifier input terminals. In a typical application the desired sensing signal may have an amplitude of a few millivolts while the noise or interference signals may be of several volts so as to readily override the desired signal to be amplified. Therefore, direct current amplifying circuits for use in these environments must possess the ability to reject these interference or common mode signals as well as provide the amplification of the desired direct current signals. These noise rejection characteristics are requirements above and beyond the normal requirements for direct current amplifiers, namely, having stable amplifying characteristics and stable direct current or zero drift properties.

Various means have been proposed in the past for obtaining both common mode rejection and stable amplifying characteristics. Common mode rejection generally involves isolating the input and output circuits in a particular fashion while stabilization of the amplifier has been achieved to a certain degree by utilizing feedback techniques. The feedback arrangements are only operative to stabilize the effects of the variable or non-linear elements included within the feedback loop. Although feedback arrangements have been proposed which include all the variable circuit elements within the feedback loop in an attempt to provide overall amplifier stabilization, such a proposed arrangement utilizes variable or nonlinear elements in the feedback circuit itself so as to introduce variations in the amplifier response.

The present invention provides an improved and inexpensive differential direct current amplifier circuit having both good interference or common mode rejection characteristics and which is completely independent of ground lead resistances or variations thereof, as well as having an overall negative feedback circuit made up of passive circuit elements capable of use for amplifying low-level input signals. The direct current amplifier circuit of this invention utilizes commercially available, reliable components leading to an amplifier having stable amplifying and direct current drift characteristics over substantially long periods of time. The differential direct current amplifier circuit is also capable of use with either grounded or ungrounded input sources. Briefly, the direct current amplifying circuit disclosed comprises a conventional differential direct current amplifying means having a pair of input circuits and a pair of output circuits with one of the latter circuits being connected to ground. The input circuit for the amplifying means is arranged to be isolated from its output circuit to provide the desired common mode rejection. This common mode rejection arrangement is combined with the feedback circuit means to provide the desired stabilization characteristic for the amplifying circuit.

These desirable features are achieved by the provision of input circuit means which may be resistive impedance means connected in series circuit relationship with each of the input circuits for the amplifier and which input impedance means are connected in common with individual feedback circuit means connected between the input and the output circuits of the amplifier. When the input impedance means and the feedback means take the form of resistive impedance means a bridge-type circuit is defined in the input to the direct current amplifier by these four resistive impedance elements. The feedback resistors of this input bridge-type circuit are proportioned to have a resistance value substantially greather than the resistance values of the input resistors whereby a balanced bridge condition exists as to the interfering or common mode signals while an unbalanced bridge relation exists as to the desired direct current signals. Since the direct current amplifier is coupled between a pair of bridge terminals across which the balanced condition exists the interfering signals are effectively not amplified while the desired direct current signals are passed to and amplified by the direct current amplifier. In addition to functioning in the bridge circuit the feedback resistors are arranged to provide the overall negative feedback and which feedback loop is coupled to include therebetween all the variable or non-linear circuit elements thereby rendering the direct current amplifier stable. The feedback circuit itself comprises completely passive circuit elements and thereby avoids the introduction of any variations into the amplifier.

In one specific embodiment of the invention a modulated carrier type of amplifier is employed wherein a conventional chopper is utilized as the modulating means. In this embodiment the input circuit to the chopper is provided with the input impedance means and the remaining portions of the bridge circuit are defined by the feedback circuit elements coupled to the output circuits for the amplifier and which feedback circuit is coupled around the usual alternating amplifiers and demodulating circuits.

The usage of the term direct current input voltages or signals as referred to in the specification and in the claims is to be construed as to not only include direct current signals but low-frequency alternating current signals. In the embodiment wherein a modulated carrier type of amplifier is employed the frequencies of the input signal need only be lower than the carrier frequency of the modulator.

Figure 2:
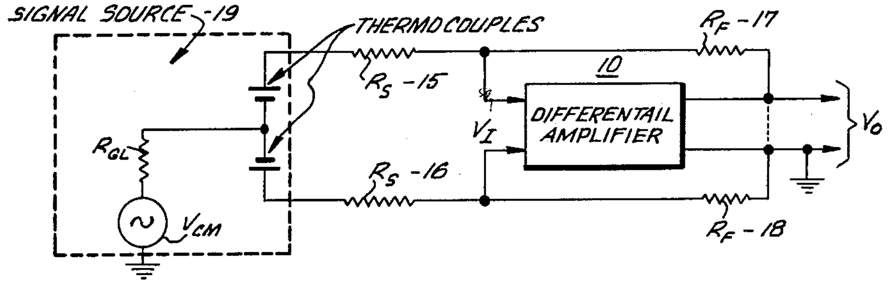
Figure 3:
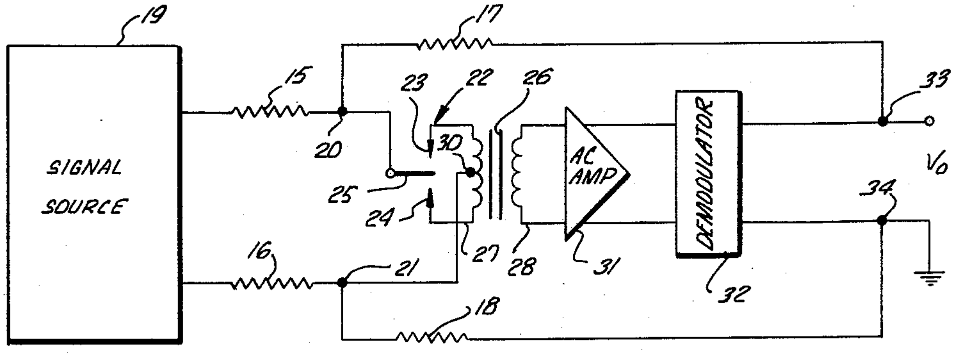
Figure 4:
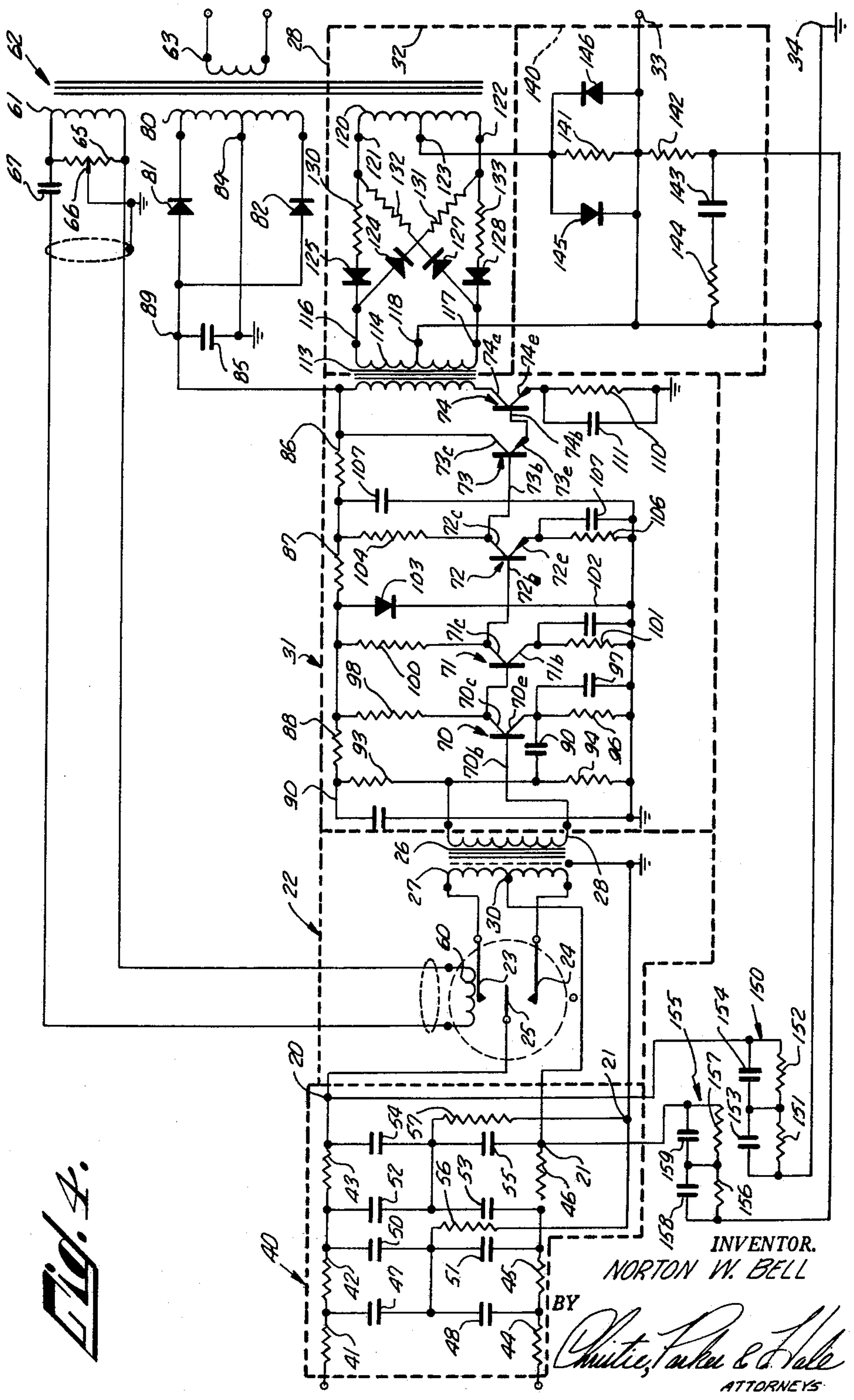

The invention is explained in more detail in the following description and in the accompanying drawings, in which:

FIG. 1 is a block diagram of a typical application of a direct current amplifying circuit embodying the invention, FIG. 2 is an equivalent circuit to that of FIG. 1 indicating the sources of interference for purposes of analysis, FIG. 3 is a schematic-block diagram of a specific embodiment of the invention; and FIG. 4 is a schematic diagram of another embodiment of the invention.

Referring to FIG. 1, wherein a typical application of a differential amplifier 10 is shown for use in combination with a thermocouple 12 used to measure the temperature of an object 13, the amplifier problems will become more evident. It is often desirable to ground the thermocouple 12 directly to the object or body 13 under measurement, also, a utilization device 14 is coupled to receive the amplified signals from the amplifier 10 and is generally provided with a grounded connection as shown. Therefore, a circuit path exists between the utilization device 14 and the object 13 undergoing measurement through the amplifier 10. The distance between the object under measurement 13 and the input to the amplifier 10 may be on the order of one mile, so an interfering or common mode signal on the order of five volts may be encountered along with the millivolt signal provided by the thermocouple 12. In addition variations may be introduced into the amplifier 10 by means of a ground lead resistance, $R_{GL}$, the resistance between ground and the body 13 under measurement. These ground lead resistance variations should have no effect on the response of the amplifier 10.

These signal source variations may be effectively eliminated so as to cause the output voltage $V_O$, of the amplifier 10 to be substantially independent of both the common mode voltages and the ground lead resistance, $R_{GL}$, under certain circuit conditions. This beneficial result is achieved in accordance with the teachings of this invention through the provision of a bridge type circuit for the input to the amplifier 10 and which bridge type circuit comprises the input resistors 15 and 16 in combination with the feedback resistors 17 and 18.

The proof that the output voltage, $V_O$, is independent of the common mode signal, identified as, $V_{CM}$, may be seen by reference to FIG. 2 wherein an equivalent circuit for an application of the type shown in FIG. 1 is illustrated. In the equivalent circuit of FIG. 2, the common mode signal, $V_{CM}$, is shown in series circuit relationship with the ground lead resistance, $R_{GL}$. Thermocouple sensing elements are shown as a pair of thermocouples represented by batteries having a common connection with the ground lead resistance $R_{GL}$. One of the thermocouples or batteries may be a reference thermocouple. The input resistors 15 and 16 are further identified as $R_S$ while the feedback resistors 17 and 18 are similarly identified as $R_F$. It is well known that for feedback circuits wherein large amounts of negative feedback are employed the gain of the amplifier may be expressed as $$A=\frac{1}{B}$$

wherein B is the feedback factor. It is also known that the gain of the amplifier may be expressed as the ratio of the output voltage to the input voltage of the amplifier or $$A=\frac{V_O}{V}$$

Accordingly, the feedback factor beta can be expressed as $$B=\frac{V_I}{V_O}$$

Considering the case where the ground lead resistance, $R_{GL}$, is equal to zero, an equivalent circuit may be developed for this condition and it can be shown that B is represented by $$\frac{V_I}{V_O}=\frac{R_S R_I}{(2R_S+R_I)\left[R_F+\frac{R_S(R_S+R_I)}{2R_S+R_I}\right]} \quad (1)$$

wherein $R_I$ represents the input impedance of the amplifier 10. Accordingly, when $R_F>>R_S$ Expression 1 can be simplified and becomes $$\frac{V_I}{V_O}=\frac{R_S R_I}{R_F(2R_S+R_I)} \quad (2)$$

In deriving the above expressions the internal impedances of the thermocouples were considered to be essentially equal and very small compared to the impedance of the resistors 15 and 16. Accordingly, the impedances of the thermocouples were neglected. In the same fashion, since the output impedance of the amplifier 10 looking into the output terminals is very small compared to the impedances of the resistors 17 and 18, as is the case where the output element of the amplifier 10 is a demodulator, the output impedance of the output terminals may be neglected. This connection is indicated by the dotted line between the output terminals of the amplifier 10 in FIG. 2.

In the same fashion when $R_{GL}$ is equal to infinity ($\infty$), an equivalent circuit can be drawn and traced to show that $$\frac{V_I}{V_O}=\frac{R_S R_I}{(2R_S+R_I)\left[R_F+\frac{R_S R_I}{2R_S+R_I}\right]} \quad (3)$$

and simplifying this Expression 3 when $R_F>>R_S$, beta, B, is represented as:

$$\frac{V_I}{V_O}=\frac{R_S R_I}{R_F(2R_S+R_I)} \quad (4)$$

It is now seen by comparing Expressions 2 and 4 that the feedback factor, B, is the same for the two extremes of $R_{GL}$, which shows that the feedback factor is not dependent upon the ground lead resistance $R_{GL}$, or the variations thereof. It can also be shown that this relationship is true for any value of $R_{GL}$, intermediate zero and infinity ($\infty$). Therefore, the common mode signal coupled to the amplifier 10 is essentially balanced out so as to not be coupled to the amplifier when the ratio below is true $$\frac{R_{15}}{R_{17}}=\frac{R_{16}}{R_{18}}, \text{ and } R_{17}\gg R_{15}, \text{ and } R_{18}\gg R_{16}$$

This balanced relationship is readily seen when resistors 15 and 16 are considered to be of equal resistance value while the resistors 17 and 18 are also equivalent.

Thus, the balanced bridge network effectively isolates the input circuit to the amplifier 10 from the common mode interference signals and with large amounts of negative feedback, the overall gain depends primarily on beta, B. The bridge is unbalanced relative to the desired signal provided by the thermocouple 12 and which causes the desired direct current signals to be coupled into the amplifier 10 and to be amplified thereby. It can also be seen that since the output impedance of the amplifier 10 is negligible, the bridge is maintained in balance for any changes in either the common mode signal, $V_{CM}$, or ground lead resistance, $R_{GL}$, thereby maintaining the input signal to the amplifier 10 the same.

It should also be noted that the amplifier characteristics are not controlling and in the above expressions the input impedances are merely specified and so any suitable direct current amplifier may be employed.

Now, referring to FIG. 3 an embodiment of the invention employing a modulated carrier type of direct current amplifier 10 will be described. The low-level direct current signal source for this amplifier is generally indicated in block form and identified by the reference character 19.

The modulator 22 may be a synchronous vibrator including a pair of fixed contacts 23 and 24, a movable contact 25 which is connected to the terminal 20 and a transformer 26 having a primary winding 27 and a secondary winding 28. The primary winding 27 has a centertap connection 30, which is connected to the terminal 21. The modulator 22 may conventionally modulate a 60-cycle carrier voltage so that the A.-C. amplitude that is impressed across the secondary winding 28 is proportional to the D.-C. input voltage that is impressed across the terminals 20, 21.

To amplify the A.-C. signal developed in modulator 22, an A.-C. amplifier of conventional design is connected to the secondary winding 28. The output signal from the amplifier 31 is fed to a demodulator 32, which is synchronized with the operation of the modulator 22 to provide an output signal across a pair of output terminals 33, 34 that is proportional to the original D.-C. input voltage. The output terminal 34 is connected to ground. A pair of feedback impedances 17 and 18, which may, for example, be matched resistors, are connected between the output terminals and the input circuit of the modulator 22. As is shown, the resistor 17 is connected between the terminals 33 and 20, and the resistor 18 is connected between the terminals 34 and 21. The resistors 15, 16, 17 and 18 form the bridge network for effectively isolating the input circuit to the modulator 22 from common mode interfering signals, $V_{CM}$.

Referring now to FIG. 4, there is disclosed another embodiment of an amplifier employing the principles of the present invention in which an input low pass filter 40 is connected between the input terminals and ground for attenuating the common mode interfering signals. This input low pass filter 40 also attenuates any alternating current signals that are induced between the leads connecting the input terminals to the signal source, commonly referred to as normal mode signals. The input filter 40 includes three separate resistors 41, 42, and 43 connected in that order between the topmost input terminal and the terminal 20. Another three resistors 44, 45, 46 are connected in the order named between the lowermost terminal and terminal 21. The resistors 41 and 44 may be matched, the resistors 42 and 45 may be matched and the resistors 43 and 46 may be matched to provide equal impedance values between the input terminals and the terminals 20 and 21. A first pair of bypass capacitors 47 and 48 are connected in series between the junction of the resistors 41 and 42 and the junction of the resistors 44 and 45. A second pair of bypass capacitors 50 and 51 are connected in series between the junction of the resistors 42 and 43 and the junction of the resistors 45 and 46. A third pair of capacitors 52, 53 are also connected in series between the junction of the resistors 42 and 43 and the junction of the resistors 45 and 46. A fourth pair of capacitors 54 and 55 are connected in series between the terminals 20 and 21. A pair of common mode attenuating resistors 56 and 57 are connected between ground and the junction of the capacitors 50 and 51 and the junction of the capacitors 54 and 55, respectively. Many types of low pass filters known in the art could be substituted for the specific one disclosed in the FIG. 3. The low pass filter should provide a low impedance path between the input terminals 10 and 11 for attenuating alternating current normal mode signals and a low impedance path between each of the input terminals and ground for attenuating common mode alternating current signals.

The output side of the low pass filter 40 is connected to the input circuit of the modulator 22 which is illustrated as including an actuating winding 60 for controlling the operation of the movable contact 25. The actuating winding 60 is connected by means of a shielded cable to a secondary winding 61 of a power transformer 62, which includes a primary winding 63 adapted to be connected to a suitable source of 60-cycle alternating current. The secondary winding 61 is provided with a shunt potentiometer 65 including a movable contact 66 which is connected to ground. The contact 66 is adjusted to balance each terminal of the secondary winding 61 so that the magnitude of the potentials developed across the winding will be equal with respect to ground. A coupling capacitor 67 is connected in series with one terminal of the winding 61, as is shown in FIG. 4.

The output signal from the modulator 22 is coupled to the A.-C. amplifier 31 by means of the secondary winding 28. The A.-C. amplifier is illustrated as a transistor amplifier including transistors 70, 71, 72, 73, and 74 of the PNP junction variety. Each of the transistors 70 through 74 includes emitter, collector, and base electrodes designated by the subscripts *e*, *c*, and *b*, respectively.

A negative source of energizing potential is coupled to the collectors of each of the transistors by means of a secondary winding 80 on the transformer 62 and a pair of rectifying diodes 81 and 82. As is shown, the cathodes of the diodes 81 and 82 are connected to respective ends of the secondary winding 80. This secondary winding 80 includes a center-tap 84, which is connected to ground to provide a full wave negative supply voltage at the anodes of the diodes 81 and 82 with respect to ground. This negative voltage is filtered to decrease the ripple content thereof by a filter capacitor 85, having a negative terminal 89 connected to the anodes of the diodes 81 and 82. This negative energizing potential at the terminal 89 is fed to the various collector electrodes of the transistors, as will be more fully explained later. Three decoupling resistors 86, 87, 88 are provided for isolating one or more of the individual transistor states from the succeeding states. As is shown, the resistors 86, 87, 88 are connected in series in that order between the negative terminal 89 and a negative terminal of a filter capacitor 90, the other terminal of which is connected to ground.

To derive a signal from the modulator 22 the base electrode, $70_b$, of the transistor 70 is connected to one end of the secondary winding 28, the other end of which is connected through a capacitor 76 to the emitter electrode, $70_e$. Base bias is provided for the transistor 70 by means of a pair of voltage divider resistors 93 and 94 that are connected in series between the terminal 90 and ground. The junction point of the resistors 93 and 94 is connected to the other terminal of the secondary winding 28. An emitter resistor 96 is connected between the emitter electrode, $70_e$, and ground, and a bypass capacitor 97 is connected in parallel with the emitter resistor 96. A collector resistor 98 is connected between the junction of the resistors 87 and 88 and the collector, $70_c$, for furnishing operating current to the transistor 70. The collector electrode, $70_c$, is also connected directly to the base electrode, $71_b$, of the transistor 71, the collector electrode, $71_c$, of which is connected through a collector resistor 100 to the junction of the resistors 87 and 88. An emitter resistor 101 and bypass capacitor 102 are connected in parallel between ground and the emitter, $71_e$. A zener diode 103 is connected between the junction of the resistors 87 and 88 and ground to stabilize the collector supply voltages for the first two stages of amplification or for the transistors 70 and 71. The collector, $71_c$, of the transistor 71 is connected directly to the base electrode, $72_b$, of the transistor 72. Energizing potential is supplied to the transistor 72 through a collector resistor 104 which is connected between the collector, $72_c$, and the junction of the resistors 86 and 87. An emitter resistor 106 and a bypass capacitor 107 are connected in parallel between the emitter, $72_e$, and ground. A filter capacitor 107 is connected between the junction of the power supply resistor 86 and 87 and ground.

The signal developed at the collector, $72_c$, is coupled directly to the base electrode, $73_b$, of transistor 73. The collector, $73_c$, is connected directly to the negative terminal 89. The emitter electrode, $73_e$, is connected directly to the base electrode, $74_b$, for coupling the signal developed in the transistor 73 to the input circuit of transistor 74. The emitter electrode, $74_e$, is coupled to ground through the parallel combination of an emitter resistor 110 and a bypass capacitor 111. The collector electrode, $74_c$, is connected to one terminal of secondary winding 112 of a coupling transformer 113, the other terminal of the winding 112 being connected to the negative power supply terminal 89. The transformer 113 includes a secondary winding 114 which includes a pair of end terminals 116 and 117 and a center-tap connection 118. This coupling transformer 113 is a part of the demolulator 32 which demodulates the alternating current signals developed across the winding 112.

The demodulator 32 includes a secondary winding 120 on the power transformer 62 for supplying a carrier signal to the demodulator that is synchronized with the carrier signal supplied to the modulator 22. The secondary winding 120 includes end terminals 121 and 122 and a center-tap connection 123. Four gating diodes 125, 126, 127, and 128 and four load resistors 130, 131, 132, and 133 are incorporated in the demodulator 28 for providing a direct current output signal across the center-taps 118 and 123 that is proportional to the original direct current input signal applied across the terminals 10 and 11. As is shown, the resistor 130 and the diode 125 are connected in a series between the terminals 116 and 121, the cathode of the diode 125 being connected to the terminal 116. The diode 126 and the resistor 131 are connected in series, in that order, between the terminal 116 and the terminal 122, the anode of the diode 126 being connected to the terminal 116. The diode 127 and the resistor 132 are connected in series between the terminals 117 and 121, the anode of the diode 127 being connected to the terminals 117. The diode 128 and the resistor 133 are connected in series between the terminals 117 and 122 with the cathode of the diode 128 being connected to the terminal 117. The output circuit of the demodulator 28 is connected through a low pass filter indicated generally at 140 to the output terminals 33 and 34. The low pass filter is utilized to attenuate the 120, 240, 360 etc. cycle signals that appear in the output circuit of the demodulator 32. This low pass filter comprises a first resistor 141, second resistor 142, a capacitor 143, and a third resistor 144, connected in series in the order named between the terminals 118 and 123. A pair of diodes 145 and 146 are connected in reverse polarity across the resistor 141 to decrease the time response of the low pass filter to signals having fast rise or fall times.

A first feedback impedance indicated generally at 150 is connected between the output terminal 34 and the terminal 20, and a second feedback impedance indicated generally at 155 is connected between the output terminal 33 and the terminal 21. The impedance 150 includes a pair of series-connected resistors 151 and 152, and a pair of capacitors 153 and 154 connected across the resistors 151 and 152, respectively. Likewise, the feedback impedance 155 includes a pair of series-connected resistors 156 and 157 and a pair of capacitors 158 and 159 connected across resistors 156 and 157, respectively. The capacitors 153, 154, 158, and 159 are provided for shaping the frequency response of the amplifier to prevent oscillations. The resistors 151 and 152 should be matched with the resistors 156 and 157, respectively, to again provide a balanced bridge feedback network similar to the one described hereinabove, so that common mode signals will produce a substantially zero voltage across the terminals 20 and 21 of the input circuit to the modulator 22. The operator of the feedback bridge network of the circuit of FIG. 4 is similar to the operation of the feedback network of the circuit of FIGS. 1–3.

In the operation of the circuit of FIG. 4, a direct current input signal applied across the input terminals is translated through the input filter 40 and applied between the moving contact 25 and the center-tap 30 of the modulator 22. The moving contact 25 is caused to alternately make contact with the fixed contacts 23 and 24 by means of the actuating winding 60. Thus, an alternating current signal flows through the primary winding 27 of the transformer 26 that has an amplitude proportional to the level of the direct current input signal. This A.-C. voltage is induced across the secondary winding 28 and applies an alternating current signal between the base and emitter electrodes of the transistor 70. This alternating current signal is amplified by the succeeding stages or transistors of the amplifier 31 and applied across the primary winding 112 of the transformer 113. The current flow through the winding 112 induces an alternating current voltage across the secondary winding 114 that is either in phase or 180° out of phase with the carrier or 60-cycle signal that is applied to the secondary winding 120, depending upon whether the signal that is applied across the input terminals is positive or negative. If the signal applied across the winding 114 is in phase with the signal applied across the winding 120, the diodes 126 and 127 will be rendered alternately conducting, to produce a positive output signal across the terminals 33 and 34. On the other hand, if the signals induced across the windings 114 and 120 are out of phase, the diodes 125 and 128 will be rendered alternately conducting, to produce a negative signal across the output terminals 33 and 34.

There has thus been disclosed a direct current amplifier circuit having common mode rejection and an overall negative feedback circuit for amplifying low-level signals. The amplifier is arranged with a balanced bridge arrangement thereby rendering the amplifier relatively insensitive to interfering signals and to cause the feedback arrangement to stabilize the amplifier against gain variations and other non-linearities in the components of the amplifier.

What is claimed is:

1. An amplifying circuit for low-level direct current voltage signals and which direct current signals include interfering signals in combination, said amplifier circuit comprising amplifying means having a single pair of input terminals and a single pair of output terminals, one of said output terminals is directly connected to a point of reference potential and the voltage developed between the output terminals is only dependent upon the difference in potential between the input terminals, individual input impedance means connected in series circuit relationship with each of the input terminals for said amplifying means to receive the combination of direct current signals and the interfering signals applied through said input impedance means to said input terminals, and separate impedance means connected to a different one of the output terminals for the amplifying means and in common with the amplifier end of a different one of the input impedance means, said individual input impedance means and separate output impedance means arranged to thereby define a single negative feedback voltage circuit between the input and output terminals of said amplifying means, the input impedance means and the output impedance means of said feedback circuit being proportioned relative to each other to provide common mode rejection by causing any interfering signals delivered to said input terminals to be balanced out and to be out of balance relative to the applied direct current difference signals.

2. An amplifying circuit as defined in claim 1 including circuit elements subject to variations between said input and output terminals and wherein said feedback impedance means are passive circuit elements coupled between the input and output circuits to include all said variable impedance elements within the interconnections to thereby substantially completely stabilize the amplifying means against such variations.

3. An amplifying circuit as defined in claim 1 wherein said input impedance means is further defined as a filter for attenuating the interfering signals.

4. Amplifying apparatus including an amplifier having a single pair of input terminals and an output circuit including a single pair of output terminals, one of said output terminals is directly connected to a point of reference potential and wherein the amplifier is further characterized in that the voltage developed between the output terminals is only dependent upon the difference in potential between the input terminals, individual input resistors separately connected in series circuit relationship with a different one of said input terminals, and a pair of output resistors each connected between a different output terminal and in common with the amplifier end of a different one of said input resistors and whereby the combination of said pair of input and output resistors define a single negative feedback circuit, the output resistors being of a substantially greater resistance value than the input resistors.

5. A circuit comprising a direct current amplifier having an input circuit including a single pair of input terminals and an ouput circuit including a single pair of output terminals, one of said output terminals is directly connected to a point of reference potential and the voltage developed between the output terminals is only dependent upon the difference in potential between the input terminals, individual input impedance elements of substantially equal impedance value connected in series circuit relationship with a different one of the input terminals, and individual impedance elements of substantially equal impedance value and of a greater impedance value than the impedance of said input elements each connected between an individual one of the output terminals and in common with the amplifier end of a different one of said input impedance elements and defining a single negative feedback circuit with said input elements whereby the combination of said input impedance elements and said single negative feedback circuit provides common mode rejection.

6. A circuit as defined in claim 5 wherein said direct current amplifier includes circuit elements of variable impedance and wherein said impedance elements comprise resistive impedance elements, and said feedback circuit being connected to include all of the variable impedance elements within the feedback circuit loop.

7. A circuit as defined in claim 5 wherein said direct current amplifier has an isolated input circuit.

8. A direct current amplifier comprising a direct current modulator having an input circuit including a single pair of input terminals, first and second input impedance means separately connected in series circuit relationship with a different one of the input terminals, an alternating current amplifier connected to receive the signals from the modulator, demodulating means couplied to said amplifier and having an output circuit including a single pair of output terminals, first and second output impedance means each separately connected between a different one of said output terminals and to a different one of the modulator input terminals in common with the modulator end of the input impedance means, said input and output impedance means defining a closed negative feedback circuit, means for applying voltage signals to be amplified including interfering signals through said input impedance means to said input terminals, said first and second input impedance means having a preselected impedance value substantially less than the impedance values of said first and second output impedance means, said input impedance means and said output impedance means being further proportioned relative to one another to balance out any interfering signals and to be out of balance relative to the signals to be amplified.

9. A direct current amplifier as defined in claim 8 wherein said first and second input impedance means and output impedance means comprise resistive impedance means.

10. A direct current amplifier for direct current voltage signals combined with interfering signals said amplifier including a modulator for converting a direct current signal to an alternating current signal and including first and second input terminals and an output circuit; first resistive impedance means connected in series circuit relationship with said first input terminal; second resistive impedance means connected in series circuit relation with said second input terminal, said first and second resistive impedance means having substantially equal resistance values; low pass resistance-capacitance filter means including said first and second resistive impedance means connected between each of said first and second input terminals and a point of reference potential for providing a low impedance to alternating current signals between each of said first and second input terminals and said point of reference potential, an alternating current signal amplifier having an input and an output circuit, the input circuit of said amplifier being connected to the output circuit of said modulator to receive the alternating current signal therefrom; a demodulator for converting an alternating current signal to a direct current signal and including an input and an output circuit, the input circuit of said demodulator being connected to the output circuit of said amplifier; the output circuit of said demodulator having first and second output terminals, one of said output terminals is directly connected to a point of reference potential, third resistive impedance means connected between said first output terminal and the modulator end of said first impedance means connected to the first input terminal, and fourth resistive impedance means connected between said second output terminal and the modulator end of said second impedance means connected to the second input terminal, said third and fourth resistive impedance means having substantially equal resistance values and defining a negative feedback circuit, said first and second, and third and fourth resistive impedance means being further proportioned relative to each other to balance out any interfering signals and to be out of balance relative to the signals to be amplified.

11. A direct current amplifier as defined in claim 10, wherein said first and second resistive impedance means each include a plurality of resistors connected in series circuit relationship and said low pass filter means includes said first and second resistive impedance means and a plurality of capacitors each separately connected between a different one of the junctions of each of the serially connected resistors of said first and second impedance means and said point of reference potential.

12. A direct current differential amplifier for low-level direct current voltage signals and which signals include interfering signals in combination, said direct current amplifier including a modulator of the electromechanical type having an input circuit including first and second input terminals and an output circuit, at least one input resistor connected in series circuit relationship with said first input terminal, at least one input resistor connected in series circuit relationship with said second input terminal, the series resistance connected to said first and second input terminals having a substantially equal resistance value; a transistor alternating current amplifier having an input circuit and an output circuit, the input circuit of said amplifier being connected to the output circuit of said modulator, a demodulator of the full wave phase sensitive type synchronized with the operation of said modulator and including an input and an output circuit, the input circuit of said demodulator being connected to the output circuit of said amplifier; a pair of output terminals connected to the output circuit of said demodulator; at least one resistor connected between said first output terminal and the modulator end of said input resistor connected to said first input terminal, and at least one resistor connected between said second output terminal and the modulator end of said input resistor connected to said second input terminal whereby the latter-mentioned resistors define a negative feedback circuit, the resistance between said first output terminal and said first input terminal and the resistance between said second output terminal and said second input terminal being substantially equal, one of said output terminals is directly connected to a point of reference potential, said pair of input resistors and said pair of resistors included in said feedback circuit are proportioned to balance out any interfering signals and to be out of balance relative to the difference signals to be amplified.

(References on following page)

References Cited in the file of this patent

UNITED STATES PATENTS

| | | |
|---|---|---|
| 2,167,368 | Meyers | July 25, 1939 |
| 2,370,483 | Muffly | Feb. 27, 1945 |
| 2,497,129 | Liston | Feb. 14, 1950 |
| 2,687,474 | Richmond | Aug. 24, 1954 |
| 2,752,564 | Ryenson | June 26, 1956 |
| 2,775,657 | Van Zelst | Dec. 25, 1956 |
| 2,801,296 | Blecher | July 30, 1957 |
| 2,813,934 | Cibelius et al. | Nov. 19, 1957 |
| 2,832,848 | Neff | Apr. 29, 1958 |
| 2,832,886 | Morrill | Apr. 29, 1958 |
| 2,866,018 | Bell | Dec. 23, 1958 |
| 2,885,612 | Larsen | May 5, 1959 |
| 2,886,657 | Hirtreiter | May 12, 1959 |

OTHER REFERENCES

Publication, Wireless World, November 1956, page 98, "Transistor High Gain Preamplifier" (1958).